(12) United States Patent
Klingels

(10) Patent No.: US 12,060,830 B2
(45) Date of Patent: Aug. 13, 2024

(54) EXHAUST-GAS TREATMENT DEVICE FOR AN AIRCRAFT ENGINE

(71) Applicant: MTU Aero Engines AG, Munich (DE)

(72) Inventor: Hermann Klingels, Dachau (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 18/040,460

(22) PCT Filed: Aug. 2, 2021

(86) PCT No.: PCT/DE2021/100665
§ 371 (c)(1),
(2) Date: Feb. 3, 2023

(87) PCT Pub. No.: WO2022/028652
PCT Pub. Date: Feb. 10, 2022

(65) Prior Publication Data
US 2023/0332522 A1    Oct. 19, 2023

(30) Foreign Application Priority Data

Aug. 5, 2020    (DE) .................... 10 2020 209 850.6
Feb. 19, 2021    (DE) .................... 10 2021 201 629.4

(51) Int. Cl.
*F02C 7/141* (2006.01)
*B64D 27/18* (2006.01)
(Continued)

(52) U.S. Cl.
CPC ............. *F02C 7/141* (2013.01); *B64D 27/18* (2013.01); *B64D 27/40* (2024.01); *B64D 29/06* (2013.01); *B64D 33/10* (2013.01); *F01N 3/0205* (2013.01); *F02C 3/305* (2013.01); *F02C 7/16* (2013.01); *F02C 7/18* (2013.01); *B64D 33/08* (2013.01); *F01N 3/02* (2013.01); *F01N 13/082* (2013.01); *F01N 2260/02* (2013.01); *F02C 7/12* (2013.01); *F02C 7/185* (2013.01); *F05D 2220/323* (2013.01); *F05D 2220/72* (2013.01); *F05D 2260/213* (2013.01); *F05D 2270/08* (2013.01);
(Continued)

(58) Field of Classification Search
CPC combination set(s) only.
See application file for complete search history.

(56) References Cited

U.S. PATENT DOCUMENTS 5,722,229 A * 3/1998 Provost ................... F02C 3/113
                                                          60/785
7,194,869 B2    3/2007 McQuiggan et al.
(Continued)

FOREIGN PATENT DOCUMENTS

DE    102012206123 A1    10/2013
DE    102018208026 A1    11/2019
(Continued)

*Primary Examiner* — Binh Q Tran
(74) *Attorney, Agent, or Firm* — Hinckley, Allen & Snyder, LLP; David R. Josephs

(57) ABSTRACT

The present invention relates to an exhaust-gas treatment device for an aircraft engine, comprising an exhaust-gas channel, through which an exhaust gas of the aircraft engine flows, and a first cooling unit for cooling with ambient air, characterized by a second cooling unit, which is downstream of the first cooling unit with respect to an exhaust-gas flow in the exhaust-gas channel.

19 Claims, 3 Drawing Sheets

(51) Int. Cl.
  *B64D 27/40* (2024.01)
  *B64D 29/06* (2006.01)
  *B64D 33/08* (2006.01)
  *B64D 33/10* (2006.01)
  *F01N 3/02* (2006.01)
  *F01N 13/08* (2010.01)
  *F02C 3/30* (2006.01)
  *F02C 7/12* (2006.01)
  *F02C 7/16* (2006.01)
  *F02C 7/18* (2006.01)

(52) U.S. Cl.
  CPC ............... *F05D 2270/082* (2013.01); *F05D 2270/0831* (2013.01)

(56) References Cited

U.S. PATENT DOCUMENTS

| | | |
|---|---|---|
| 7,971,438 B2 | 7/2011 | Taylor et al. |
| 8,291,716 B2 | 10/2012 | Foster et al. |
| 9,102,416 B1 * | 8/2015 | Cutler ............... A62C 99/0018 |
| 2008/0072577 A1 | 3/2008 | Taylor et al. |
| 2009/0158739 A1 * | 6/2009 | Messmer ............. F01K 21/047 60/648 |
| 2011/0173947 A1 | 7/2011 | Zhang et al. |
| 2013/0327059 A1 | 12/2013 | Richardson |
| 2016/0237902 A1 * | 8/2016 | Zhang .................... F02C 7/143 |
| 2017/0292412 A1 | 10/2017 | Fonseca |
| 2018/0216532 A1 * | 8/2018 | Smith ...................... F02C 7/10 |
| 2018/0334959 A1 * | 11/2018 | Jagtap ...................... F02C 6/18 |
| 2019/0293346 A1 * | 9/2019 | Schwarz .................. F17C 7/02 |
| 2020/0191051 A1 * | 6/2020 | Homison ................ F02C 7/143 |

FOREIGN PATENT DOCUMENTS

| | | |
|---|---|---|
| EP | 3048281 A1 | 7/2016 |
| WO | 2019166040 A1 | 9/2019 |
| WO | 2019223823 A1 | 11/2019 |
| WO | 2020187345 A1 | 9/2020 |

* cited by examiner

EXHAUST-GAS TREATMENT DEVICE FOR AN AIRCRAFT ENGINE

BACKGROUND OF THE INVENTION

The present invention relates to an exhaust-gas treatment device for an aircraft engine.

The drive unit of such an aircraft engine can be, in particular, an axial turbomachine, which, functionally, is divided into compressor, combustion chamber, and turbine. Air intake is compressed in the compressor and then is subsequently mixed with fuel, such as, for example, kerosene, and this mixture undergoes combustion in the combustion chamber. The hot gas or combustion gas formed flows through the turbine and is expanded therein, whereby energy is also withdrawn proportionately from the gas for driving the compressor. For generation of propulsion, it is possible to provide, for example, a propeller or, in particular, a fan, which likewise is driven by way of the turbine.

Such an engine with a fan is also referred to as a turbofan engine. The exhaust-gas treatment device under discussion can be arranged here downstream of the turbine; that is, the exhaust gas that is expanded in the turbine can flow through the exhaust-gas treatment device. This and, in particular, the reference to a turbofan engine is intended to illustrate a preferred field of application, but not to limit the subject in terms of its generality.

SUMMARY OF THE INVENTION

The present invention is based on the technical problem of specifying an advantageous exhaust-gas treatment device for an aircraft engine as well as an advantageous method for operating the exhaust-gas treatment device.

This problem is solved in accordance with the invention by the exhaust-gas treatment device discussed below. The exhaust-gas treatment device has an exhaust-gas channel and a first cooling unit assigned to it as well as, in addition, a second cooling unit downstream of the first cooling unit. In general, the cooling makes it possible to achieve at least a partial condensation of the water that is contained in the exhaust gas and can result, along with further products ($CO_2$, etc.), during the combustion of fossil fuels or else can be introduced deliberately beforehand in liquid or vapor form into the combustion chamber (see below). In the absence of condensation, the water contained in the exhaust gas can lead to condensation trails when the exhaust gas cools down in the cold ambient air (condensation trails are also being discussed as parameters influencing climate change).

By cooling the exhaust gas with the first cooling unit and the second cooling unit, that is, two cooling units in succession, such a later condensation can be or is prevented in an especially efficient manner. The condensed water can be collected, for example, already in the exhaust-gas treatment device and can, for example, be stored in the aircraft or released into the ambient air in liquid form or else used in other ways (see below for details).

Preferred embodiments are found in the dependent claims and in the entire disclosure, whereby, in the description of the features, a distinction is not always made in detail between device aspects and method or use aspects; in any case, the disclosure is to be read implicitly in terms of all claim categories. If, for example, an exhaust-gas treatment device that is suitable for a certain method is described, then, at the same time, it is to be understood as being a disclosure of a corresponding method of operation and vice versa. Likewise, the aspects relating to the exhaust-gas treatment device are always to be read in terms of an aircraft engine having such an exhaust-gas treatment device or in terms of a corresponding aircraft.

The second cooling unit is assigned to the exhaust-gas channel; in particular, a cooling element of the second cooling unit can be arranged in the exhaust-gas channel and/or the cooling element can bound the exhaust-gas channel. As discussed below in detail, the second cooling unit can be, for example, an active cooling unit, such as, for example, a compression refrigeration machine. However, on the other hand, it can also be designed as only a passive heat exchanger, which is supplied with a fluid that has a temperature below that of the level of ambient air.

The first cooling unit is likewise assigned to the exhaust-gas channel; preferably a cooling element of the first cooling unit is arranged in the exhaust-gas channel and, namely, is upstream of the second cooling unit. During operation, the exhaust gas can be precooled using the first cooling unit, thereby making possible, for example, an efficient operation of the downstream second cooling unit. In a preferred embodiment, the first cooling unit has, as a cooling element, a heat exchanger, around which or through which the exhaust gas flows. The heat exchanger of the first cooling unit acts preferably as a condenser (condenser heat exchanger). As a cooling fluid, preferably ambient air is utilized and, for example, can be conveyed by a blower or preferably by the fan of the engine.

The temperature of the ambient air utilized for cooling, like the static ambient temperature, can depend, for example, on the flight elevation and the weather conditions, but, in addition, for example, also on the pressure ratio of the blower utilized to convey the air (for example, a fan) and, for instance, also the aircraft Mach number. In any case, as a rule, the temperature of the ambient air utilized for cooling will lie above the static ambient temperature. At greater flight elevation, the cooling capacity is typically greater than it is near ground level, with a target temperature of >0° C. generally being advised because of the danger of icing.

In accordance with a preferred embodiment, the second cooling unit has a cooling circuit with an evaporator, which is assigned as a cooling element to the exhaust-gas channel. The second cooling unit can be designed, in particular, as a compression refrigeration machine, which has a condenser that is arranged outside of the exhaust-gas channel for the cooling fluid conveyed in the cooling circuit. In relation to the direction of circulation of the cooling fluid, a compressor can be arranged here between the condenser and the evaporator and/or a throttle can be arranged between the evaporator and the condenser.

In a preferred embodiment, the evaporator provided as a cooling element is a plate evaporator. It can have one plate or preferably a plurality of plates and can offer a correspondingly large interaction surface. The plates can be arranged in the exhaust-gas channel in such a way that the exhaust gas flows along the plate surfaces, that is, also between the plates.

In a preferred embodiment, one plate or a plurality of plates of the plate evaporator is or are equipped with a collecting groove. On the respective plate, the collecting groove can be arranged in the downstream half of the plate, for example, in particular on the downstream end of the plate, with respect to the exhaust gas flowing along the plate. The condensed water can collect in the collecting groove or grooves and, from there, it can be discharged from the exhaust-gas channel.

In accordance with a preferred embodiment, the second cooling unit has a heat exchanger for a cryogenic fluid, in particular for a cryogenic fuel. The heat exchanger is assigned as a cooling element to the exhaust-gas channel and, during operation, cryogenic fluid or fuel, such as, for example, LH 2 or LNG, etc., flows through the heat exchanger. Accordingly, the heat exchanger can advantageously take on a dual function, because the cryogenic fuel, such as, for example, the cryogenic hydrogen in the case of hydrogen aircraft, needs to be heated up in any event before it is injected into the combustion chamber. In this variant, too, precooling is preferably accomplished using the first cooling unit, which is upstream of the second cooling unit, In accordance with a preferred embodiment, which can be combined both with the compression refrigeration machine and with the heat exchanger for cryogenic fluid, a droplet separator is provided downstream of the second cooling unit. The droplet separator can separate off the condensed water on the basis of centrifugal force or inertia, for example, as a cyclone or centrifugal separator, for instance, or else by sharp deflection, etc. The exhaust gas can be set in rotation, for example, for centrifuging out water droplets contained in it.

In accordance with a preferred embodiment, which can be combined with the droplet separator or else can be provided as an alternative to it, an ionizer is assigned to the exhaust-gas channel and enables the exhaust gas to be electrostatically charged. This can occur, for example, by impact ionization, such as, for instance, by using a spray electrode as a corona charger. The exhaust gas or the condensed water is then electrostatically charged and a complementary pole can serve as a collecting electrode. This collecting electrode is likewise assigned to the exhaust-gas channel downstream of the ionizer.

In a preferred embodiment, a part of the cooling unit and/or an above-described droplet separator is utilized, at the same time, as a collecting electrode and hence the plate condenser or the cryogenic heat exchanger of the second cooling unit can be charged as an opposite pole. Alternatively or additionally, the droplet separator or an exhaust-gas channel section in the region of the droplet separator can be utilized as a collecting electrode.

In accordance with a preferred embodiment, the exhaust-gas treatment device has a control unit, with which the first cooling unit and the second cooling unit can be actuated. Preferably, the cooling capacity of the first cooling unit and/or the second cooling unit can be changed by means of the control unit. Preferably, the control unit is set up in such a way that, in a first operating state, cooling is accomplished using both cooling units and, in a second operating state, in contrast, only one of the two cooling units is used. The control unit can specify a respective operating state depending on an ambient temperature, for example, including the temperature of the exhaust gas after the first cooling unit, for example, and/or further operating parameters of the aircraft engine can be incorporated. The control unit can be set up, in particular, in such a way that the exhaust-gas treatment device does not ice up; that is, the exhaust-gas temperature is not <0° C.

In the second operating state, it is possible, depending on the design of the exhaust-gas treatment device, to operate either only the first cooling unit or only the second cooling unit. The latter operation can then be of interest, for example, when the second cooling unit is supplied with cryogenic fuel (see above). If the overall required cooling capacity is small, it is possible in this case to lower the energy consumption by switching off the first cooling unit and, at the same time, to ensure that adequate energy is available for heating of the cryogenic fuel. In the second operating state, however, it is possible also to switch off the second cooling unit when, for example, it is designed as a compression refrigeration machine and, for example, an adequate cooling capacity is already achieved with the first cooling unit coupled to the ambient air at high flight elevation, for example. The embodiment of the exhaust-gas treatment device with a "control unit" is intended to be explicitly disclosed also in regard to a corresponding method of operation in which, in the first operating state, both cooling units are operated and, in a second operating state, in contrast, only the first cooling unit or the second cooling unit is operated.

The invention also relates to an aircraft engine with a presently disclosed exhaust-gas treatment device and reference is explicitly made to the assessment of the prior art in regard to possible details. The aircraft engine can comprise, in particular, an axial turbomachine and a propulsor (for example, a fan), with the exhaust-gas treatment device being downstream of the turbine.

Provided in accordance with a preferred embodiment is an evaporator, in which the condensed water is transformed once again into vapor form. Preferably, the evaporator is installed between the turbine and the exhaust-gas treatment device and takes energy from the exhaust gas (it can be regarded as a "zeroth" cooling unit). The water vapor produced using the evaporator can be introduced, for example, into the gas channel of the aircraft engine, for instance in the combustion chamber or before the combustion chamber. This can be of thermodynamic advantage, for example, because the energy of the exhaust gas is utilized. The evaporator can derive the energy required for vaporization of the condensed water from the exhaust gas. The water vapor introduced into the gas channel can also be of advantage in regard to the required compressor work. Namely, in comparison to the same amount of air without water vapor, less work is required. In the combustion chamber, the water vapor can also decrease nitrogen oxides in the exhaust gas, for example, because, owing to its relatively high heat capacity, the water can prevent the creation of temperature peaks in the event of local non-uniform mixing ratios. Alternatively or additionally, the water vapor can also be utilized for the cooling of components, such as, for example, gas channel walls or, in particular, blades or vanes. To this end, it is possible for the gas flow to occur in a channel system in the interior of the component, in particular, of a blade or vane.

In an advantageous method for exhaust-gas treatment, the exhaust gas of the aircraft engine flows through the exhaust-gas channel and, by way of the second cooling unit, reaches a temperature below the exhaust-gas temperature reached by means of the first cooling unit.

The invention also relates to the use of a presently disclosed exhaust-gas treatment device in an aircraft engine or in an aircraft, in particular in the way just described.

In a preferred embodiment, it is thereby possible, in the case of a second cooling unit that is designed as a compression refrigeration machine, to arrange the condenser thereof on the aircraft or in a secondary flow channel of the aircraft engine. The cooling circuit of the compression refrigeration machine can also extend, for example, through a channel structure on or in the surface of the aircraft and the channel structure can extend over the fuselage, wings, or tail unit. Especially during flight operation, this can allow an effective dissipation of heat to the surroundings. The same arrangement possibility can be preferred for the heat exchanger of the first cooling unit, that is, for the previously discussed "condenser heat exchanger."

BRIEF DESCRIPTION OF THE DRAWINGS

The invention will be explained in detail below on the basis of exemplary embodiments, whereby, in the scope of the dependent claims, the individual features also can be essential to the invention in other combinations and also, furthermore, no distinction is made in detail between the different claim categories.

Taken individually.

DESCRIPTION OF THE INVENTION

Figure 1:
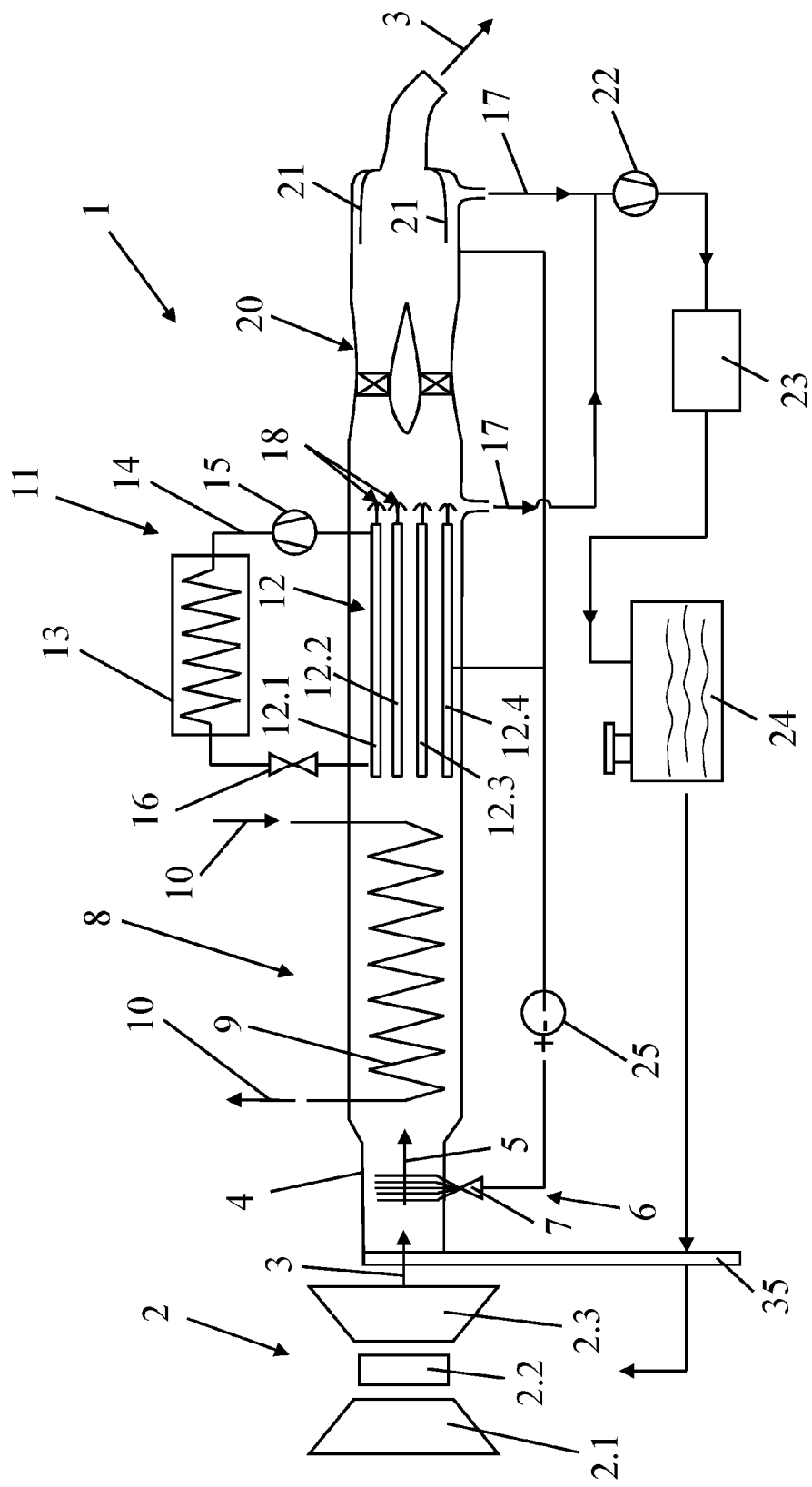
FIG. 1 shows a first exhaust-gas treatment device according to the invention in schematic illustration.

FIG. 1 shows an exhaust-gas treatment device 1 according to the invention, which is arranged downstream of an aircraft engine 2, which is indicated here only schematically. The aircraft engine 2 has a compressor 2.1, a combustion chamber 2.2, and a turbine 2.3 and can involve, for example, a turbofan engine. During operation, an exhaust gas 3 coming from the turbine 2.3 enters an exhaust-gas channel 4 of the exhaust-gas treatment device 1.

With respect to the exhaust-gas flow 5, the exhaust gas 3 therein first passes through an ionizer 6, which charges the exhaust gas 3 electrostatically, in the present case by means of a spray electrode 7 by impact ionization. Downstream of the ionizer 6, the exhaust gas 3 passes through a first cooling unit 8, which has a heat exchanger 9. Ambient air 10 flows through said heat exchanger in order to precool the exhaust gas 3.

Provided downstream of the first cooling unit 8 is a second cooling unit 11. In the present case, said second cooling unit is designed as a compression refrigeration machine; that is, it has also an evaporator 12 arranged in the exhaust-gas channel 4 and a condenser 13 provided outside thereof, the two of which are connected to each other in a cooling circuit 14. A cooling fluid, which is not depicted here, enters the cooling circuit 14 via a compressor 15 from the condenser 13 in the evaporator 12 and is conveyed between the evaporator 12 and the condenser 13 by way of a throttle 16. The evaporator 12 is designed as a plate evaporator with a plurality of plates 12.1-12.4. The exhaust gas 3 flows along the plates 12.1-12.4 and is cooled in this way, thereby leading to the condensation of the water 17 that is contained in the exhaust gas 3. Provided for collection of the water 17 are collecting grooves 18 at the downstream ends of the plates 12.1-12.4, by means of which the water 17 is collected and discharged.

Provided downstream of the second cooling unit 11 is a droplet separator 20, which, in the present case, is designed as a centrifugal separator. It sets the exhaust gas 3 in rotation, as a result of which the water droplets are conveyed radially outward under centrifugal force. There, the water 17 is discharged via baffle plates 21. By means of a condensation pump 22, it is conveyed, together with the water 17 of the collecting grooves 18 via an optionally present water treatment system 23 into a water storage tank 24, where it is available for further use, preferably being conveyed in vapor form via a post-treatment evaporator 35 once again to the aircraft engine 2. As depicted schematically, the post-treatment evaporator 35 can be arranged inside of the exhaust-gas channel 4, preferably between the turbine 2.3 and the exhaust-gas treatment device 1. The separation of water in the evaporator 12 and in the droplet separator 20 is assisted electrostatically; these two form a pole 25 that, in each instance, is complementary to the electrostatic charging by the ionizer 6.

Figure 2:
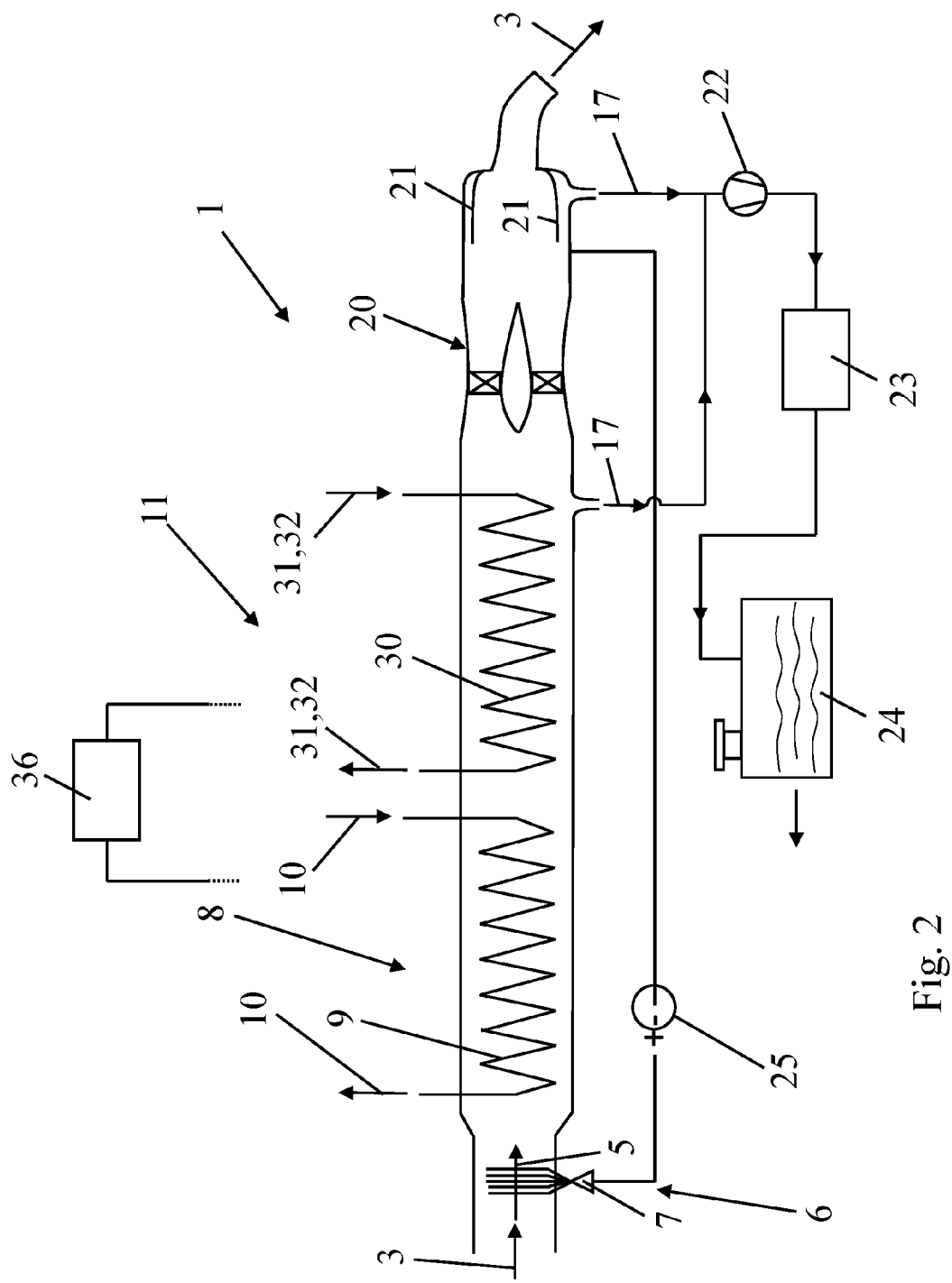
FIG. 2 shows a second exhaust-gas treatment device according to the invention in schematic illustration.

The exhaust-gas treatment device 1 in accordance with FIG. 2 is constructed in parts analogously to FIG. 1, with parts having the same or comparable function being furnished with the same reference numbers and reference being made in each instance also to the description of the respective other figures (the engine 2 is not depicted in the figure). In particular, the identical design relates to the first cooling unit 8, the ionizer 6, and the droplet separator 20. In contrast to the variant in accordance with FIG. 1, however, the second cooling unit 11 is equipped in the present case, with a heat exchanger 30, through which a cryogenic fluid 31 flows, in particular a cryogenic fuel 32. In FIG. 2, the pole 25 that is complementary to the ionizer 6 is applied exclusively in the region of the droplet separator 20; alternatively or additionally, the heat exchanger 30 could also be charged correspondingly.

Schematically depicted is a control unit 36, by means of which the cooling units 8, 11 are actuated. In a first operating state, both cooling units 8, 11 are operated; in another operating state, in contrast, when a lower overall cooling capacity is required, the first cooling unit 8 is operated only at a diminished capacity and the second cooling unit 11 is used primarily.

Figure 3:
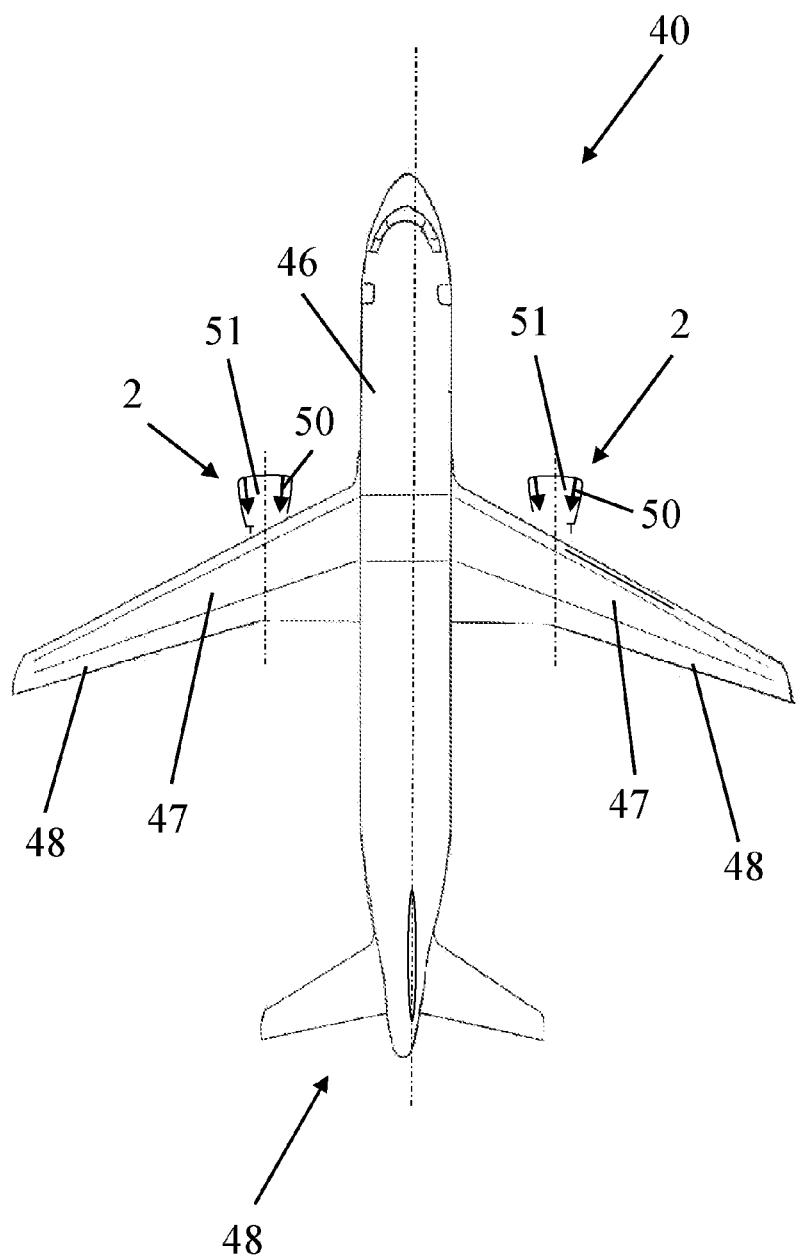
FIG. 3 shows an aircraft with aircraft engines in schematic illustration.

FIG. 3 shows in schematic illustration an aircraft 40 with two aircraft engines 2, each of which is equipped with an exhaust-gas treatment device, which is not depicted here to scale. Parts of the first cooling unit 8 and/or the second cooling unit 11 that are situated outside of the exhaust-gas channel 4 can be arranged, for example, on the fuselage 46, wing 47, tail unit 48 or, for example, also on the engine 2, such as, for instance, in the secondary flow channel 50 or on the engine nacelle 51.

What is claimed is:

1. An exhaust-gas treatment device for an aircraft engine, comprising:
   an exhaust-gas channel, through which an exhaust gas of the aircraft engine flows, and a first cooling unit arranged downstream of the aircraft engine for cooling with ambient air, further comprising a second cooling unit, which is arranged downstream of the first cooling unit with respect to an exhaust-gas flow in the exhaust-gas channel.

2. The exhaust-gas treatment device according to claim 1, wherein the first cooling unit has a heat exchanger that is configured and arranged for cooling with ambient air.

3. The exhaust-gas treatment device according to claim 1, wherein the second cooling unit has a cooling circuit with an evaporator, which is assigned to the exhaust-gas channel, wherein the evaporator is a plate evaporator.

4. The exhaust-gas treatment device according to claim 3, wherein the evaporator is a plate evaporator, wherein a collecting groove is arranged on at least one plate of the plate evaporator.

5. The exhaust-gas treatment device according to claim 1, wherein the second cooling unit has a heat exchanger with cryogenic fluid flowing therethrough.

6. The exhaust-gas treatment device according to claim 1, wherein a droplet separator is provided downstream of the second cooling unit with respect to an exhaust-gas flow in the exhaust-gas channel.

7. The exhaust-gas treatment device according to claim 6, wherein the droplet separator is a centrifugal separator.

8. The exhaust-gas treatment device according to claim 1, further comprising an ionizer assigned to the exhaust-gas channel for electrostatic charging of the exhaust gas, wherein a pole, which is complementary to the ionizer, is assigned downstream to the exhaust-gas channel with respect to an exhaust-gas flow in the exhaust-gas channel.

9. The exhaust-gas treatment device according to claim 8, wherein the complementary pole is applied on the second cooling unit and/or on a droplet separator.

10. The exhaust-gas treatment device according to claim 1, further comprising a control unit for controlling the first cooling unit and the second cooling unit, wherein the control unit is configured and arranged so the exhaust gas
is cooled in a first operating state with the first cooling unit and the second cooling unit;
is cooled in a second operating state only with the first cooling unit or the second cooling unit.

11. An aircraft with an aircraft engine having an exhaust-gas treatment device according to claim 1.

12. The aircraft according to claim 11, further comprising a post-treatment evaporator for the generation of water vapor by evaporation of water that has been condensed with the exhaust-gas treatment device, wherein the evaporator is coupled to the aircraft engine so that water vapor generated is introduced into a gas channel of the aircraft engine and/or is utilized for cooling a component assigned to the gas channel.

13. A method for operating an exhaust-gas treatment device according to claim 1, wherein
exhaust gas flows through the exhaust-gas channel, and is precooled using the first cooling unit and further cooled using the second cooling unit.

14. Use of an exhaust-gas treatment device according to claim 1 in an aircraft engine or aircraft.

15. The use according to claim 14, wherein a heat exchanger of an exhaust-gas treatment device, which is part of a cooling circuit, is arranged on the aircraft or in a secondary flow channel of the aircraft engine.

16. A method for operating an exhaust-gas treatment device for operating an aircraft according to claim 11, wherein
exhaust gas flows through the exhaust-gas channel, and is precooled using the first cooling unit and further cooled using the second cooling unit.

17. Use of an exhaust-gas treatment device in an aircraft engine or aircraft in a method according to claim 16.

18. The use of an exhaust-gas treatment device, in which a heat exchanger of an exhaust-gas treatment device according to claim 2, is part of the cooling circuit, is arranged on the aircraft or in a secondary flow channel of the aircraft engine.

19. The use according to claim 17, wherein a condenser of an exhaust-gas treatment device is part of a cooling circuit and is arranged on the aircraft or in a secondary flow channel of the aircraft engine.

* * * * *